F. J. MEYERS.
CORN-POPPERS.
No. 171,032. Patented Dec. 14, 1875.
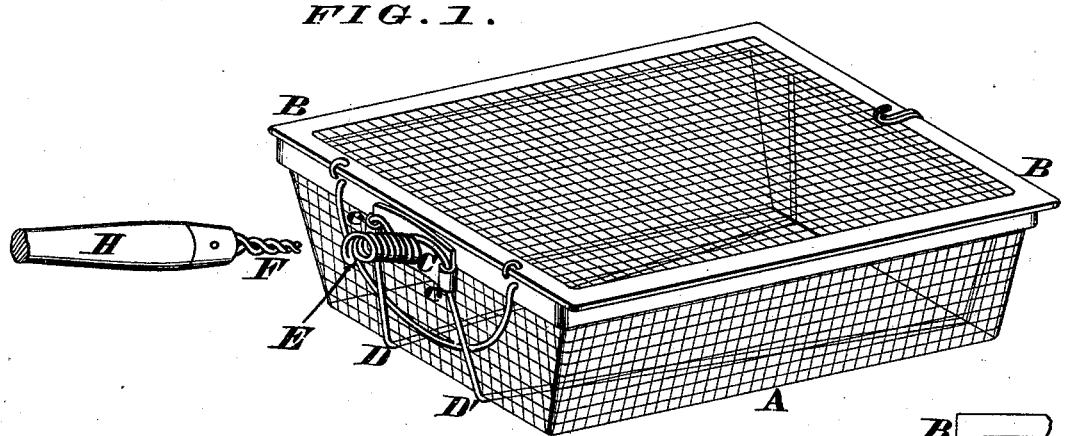
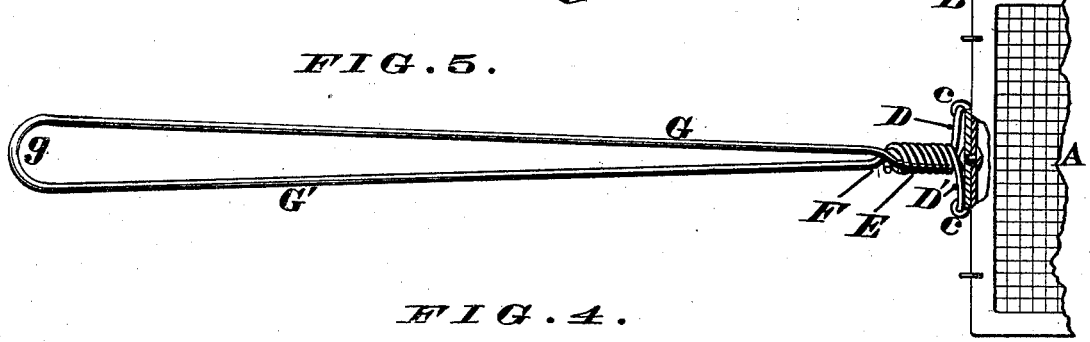
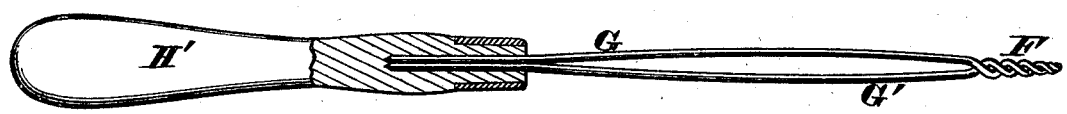
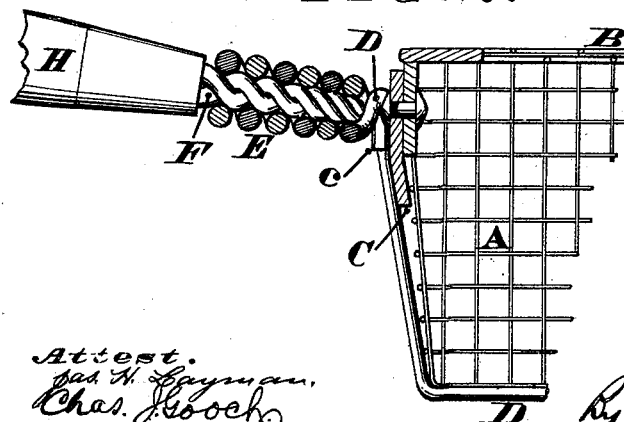
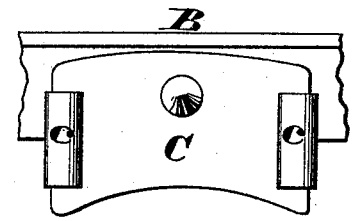
Attest.
Jas. H. Layman
Chas. J. Gooch
Frederick J. Meyers
By Knightson Att'ys

UNITED STATES PATENT OFFICE.

FREDERICK J. MEYERS, OF COVINGTON, KENTUCKY.

IMPROVEMENT IN CORN-POPPERS.

Specification forming part of Letters Patent No. 171,032, dated December 14, 1875; application filed October 21, 1875.

*To all whom it may concern:*

Be it known that I, FREDERICK J. MEYERS, of Covington, Kenton county, Kentucky, have invented a new and useful Improvement in Corn-Poppers, of which the following is a specification:

This is an improvement in those corn-poppers which have a separable handle.

In the accompanying drawing, Figure 1 is a perspective view of my popper, the handle being detached. Fig. 2 is an enlarged longitudinal section, showing a portion of the popper and of the handle attached. Fig. 3 is a view on the same scale, showing the ear-plate, with a portion of the popper-frame. Fig. 4 is a partly-sectionized representation of a modification of my handle detached. Fig. 5 is a top view, showing still another modification of my handle in position.

A may represent the grid or popper proper, of any desired form and material; and B, its customary sheet-metal frame or margin. Pivoted to said frame B is my ear-plate or bracket C, whose ears $c$ receive and firmly hold the wires D D', which, being engaged in the frame B at one end of the popper, serve to brace and support both ends and the bottom, and which, at the other end of the popper, are passed through the ears $c$ aforesaid, and have their extremities twisted, as at E, into a tubular helix, which operates as a nut to receive and hold the twisted extremities F of the wires G G' of my handle. The wires G G' may either be engaged in a wooden handle, H or H', or may be constituted of one wire, bent as at $g$. A handle thus formed is easily attached and detached, and that part of it most exposed to the fire, being wholly metallic, is not liable to be burned, while the portion grasped by the operator may be of wood or other non-conductor, as shown in Figs. 1, 2, and 4. The helical nut E, being, from its mode of construction, expansible and elastic, yields to any inequalities of the screw F, which it firmly grasps, but not with such rigidity as to forbid the unscrewing of the handle from the popper when desired. The positions of the members E and F may, of course, be reversed if desired—that is to say, the nut may be upon the handle and the screw upon the popper. Should the metallic handle be mislaid my popper can still be made available by screwing into a common wooden handle.

I claim as new and of my invention.

The helical wires E and F, of which one is adapted to receive the other, on the principle of a nut and screw, which constitute parts of the popper and handle, respectively, and enable their secure and easy attachment and separation, as explained.

In testimony of which invention I hereunto set my hand.

FRED. J. MEYERS.

Attest:
GEO. H. KNIGHT,
WALTER KNIGHT.